United States Patent [19]
Carlson

[11] 3,770,875
[45] *Nov. 6, 1973

[54] TOTALLY ENCLOSED CABLEBUS
[76] Inventor: Elmer T. Carlson, P.O. Box 18, West Granby, Conn. 06090
[ * ] Notice: The portion of the term of this patent subsequent to Mar. 31, 1987, has been disclaimed.
[22] Filed: Aug. 16, 1971
[21] Appl. No.: 172,012

Related U.S. Application Data
[60] Continuation-in-part of Ser. No. 848,541, Aug. 8, 1969, Pat. No. 3,614,297, which is a division of Ser. No. 80,609, Oct. 14, 1970, Pat. No. 3,644,663, and a continuation-in-part of Ser. No. 769,485, Oct. 22, 1968, Pat. No. 3,504,097.

[52] U.S. Cl. ............. 174/88 B, 174/68 B, 174/72 B
[51] Int. Cl. ............................................. H02g 15/08
[58] Field of Search .............. 174/68 B, 68 C, 88 B, 174/99 B, 101, 72 B, 71 B; 339/22 B

[56] References Cited
UNITED STATES PATENTS
| | | | |
|---|---|---|---|
| 2,009,376 | 7/1935 | Frank | 174/88 B X |
| 2,879,319 | 3/1959 | Carlson et al. | 174/88 B X |
| 3,207,839 | 9/1965 | Joly | 174/88 B X |
| 3,287,487 | 11/1966 | Fehr, Jr. | 174/88 B X |
| 3,504,097 | 3/1970 | Carlson | 174/99 B X |
| 3,644,663 | 2/1972 | Carlson | 174/88 B |

*Primary Examiner*—Darrell L. Clay
*Attorney*—Joseph Gray Jackson et al.

[57] ABSTRACT

A cablebus housing which has telescoping U-shaped members adapted to separate to thread insulated conductors through the housing and to contract to engage opposed faces of the conductor insulation, which are preferably octagonal in cross section to aid in heat conductivity away from the insulation. The housing has a coupling half of one type protruding from one end and adapted to cooperate with a coupling half of another type on another housing or fitting, and it has a coupling half of the other type protruding from the other end and adapted to cooperate with another housing or fitting. The telescoping housing members are moved from their expanded to their contracted positions by clamping screws, which preferably engage diverging flanges on the sides of the telescoping U-shaped members.

In some cases the housing cooperates with a fitting having a coupling half of either type suitable to couple with the housing, and having a transverse flange at the end provided with an opening through which the conductors can run. The fitting also has telescoping U-shaped members which extend from the flange less than the length of the coupling half.

In some embodiment the housing is connected to a first supplemental fitting which has parallel prongs on the side adjoining the telescoping arms of the housing members and which contacts a second supplemental fitting which has parallel prongs parallel with the bases of the U's of the housing and adapted to fit the first supplemental fitting and provide access to the conductors. The second supplemental fitting at the end removed from the housing has parallel prongs similar to those first mentioned which are adjoining the telescoping sides of the housing.

8 Claims, 28 Drawing Figures

TOTALLY ENCLOSED CABLEBUS

The present invention is a continuation-in-part of my copending applications Serial No. 848,541, filed August 8, 1969 for ELECTRICAL CONDUIT SYSTEM, now U.S. Pat. No. 3,614,297, issued Oct. 19, 1971 and Ser. No. 80,609, filed Oct. 14, 1970 for ELECTRICAL CONDUIT SYSTEM, now U.S. Pat. No. 3,644,663, granted Feb. 22, 1972. Application Ser. No. 80,609 above was a division of application Ser. No. 848,541 above, and application Ser. No. 848,541 was a continuation-in-part of application Ser. No. 769,485, filed Oct. 22, 1968 for ELECTRICAL CONDUIT, now U.S. Pat. No. 3,504,097 issued Mar. 31, 1970. These applications are therefore all a chain of parent applications of the present application with overlapping copendency going back to the very earliest of the applications above mentioned.

The present invention relates to a cablebus of the type which provides a housing around insulated conductors and cooling means for the conductor insulation and the conductors, and in which housing parts move from an expanded position in which the conductors can be threaded through the housing to a contracted position in which opposite parallel sides of the insulation, suitably octagonal in cross section, are firmly engaged so that maximum benefit can be obtained in heat dissipation.

The cablebus of the invention is preferably adapted to conform to National Electrical Code Article 365 Cablebus and provides ampacities comparable with conductors in open air.

The cablebus of the invention may be used in electric distribution for light, power, heat, welding and the like providing low impedance of single runs and matched impedance of parallel runs.

The cablebus of the invention is intended to be used on relatively low voltage, preferably about 600 volts A.C. and D.C. and to take two or more feeder wires with a permissible temperature rise of up to about 90°C.

The conductors of the invention are round concentric lay stranded conductors of copper or aluminum and of a conductor size usually in the range between No. 1/0 and 500,000 circular mils. In the cablebus of the invention the conductors may be extended continuously from the source to load or spliced in turn fittings of the run to avoid insulation damage of forced pull at elbows. There can be terminations, load taps, splices and transitions in a run with selected fittings.

One of the important advantages of the cablebus of the invention is that when the housing members are expanded, an internal surface is provided to thread through the conductors which is smooth and does not have projections which will damage the insulation or impede drawing conductors through the cablebus.

Based on representative experimental data the ampacity of a three wire system according to the present invention compared with National Electric Code standards for three wires in conduit at 90°C. hot spot temperature is as follows:

TABLE

| Copper Size Conductors | Table 310-12 National Electrical Code Ampacity 3 Conductors in Raceway | 3 conductors in Enclosed Cablebus ampicity | Percentage Increases |
|---|---|---|---|
| 1/0 | 155 | 245 | 58 |
| 250 MCM | 270 | 425 | 57 |
| 500 MCM | 405 | 660 | 63 |

Similar savings are effected for aluminum conductors. The invention results also in saving steel, aluminum, or other materials of the enclosed cablebus housing by eliminating "fill" air space required for ordinary raceways.

A purpose of the invention is to save up to 50 percent of the weight of conductor metal by more efficient cooling.

A further purpose is to save up to 75 percent of the enclosure metals.

A further purpose is to save up to 50 percent of the building space occupied by totally enclosed cablebus.

A further purpose is to eliminate elbow pulls of cable.

A further purpose is to reduce the number and variety of enclosures and fittings required for an electrical feeder.

A further purpose is to provide low voltage drop by keeping the impedance low and uniform.

A further purpose is to lower labor installation costs.

A further purpose is to minimize the number of conductor joints or splices in a feeder.

A further purpose is to provide for easy withdrawal and replacement of conductors.

A further purpose is to lower conductor and enclosure material costs of electrical feeders up to 45 percent.

In the drawings I disclose several forms of the invention, choosing the forms shown from the standpoints of simplicity in illustration, satisfactory operation and clear demonstration of the principles involved.

FIGS. 15 to 25 show various components and fittings which are used in the present invention.

In the invention the cablebus housing has telescoping U-shaped members which are put in expanded and contracted position by clamps or clamping screws. In one form of the invention the clamping screws are moved from a position in which they hold the telescoping U-shaped members in expanded relation to thread conductors through the inner space, to a position in which they hold the telescoping members together on the opposed parallel faces of the suitably octagonal or rectangular conductor insulation, supplemental pressure to close the telescoping members are preferably being applied by springs.

A normal cablebus run has the following aspects:
1. The beginning of the run.
2. Straight lengths of cablebus housing.
3. Turns in a run.
4. Connections in a run.
5. Termination of a run.
6. In some cases there are parallel runs.

As shown in FIGS. 1 to 7, a straight cablebus housing 30 intermediate the ends consists of an inverted U-shaped member 31 which has a U consisting in cross section of a base 32 bent at right angles to form arms 33 which are then bent at right angles to form opposed or diverging flanges 34 which at the ends bend at right angles (upwardly) to form end flanges 35 parallel to the arms of the U. The U-shaped member 31 telescopes with respect to another U-shaped member 40 which has a base of the U 41 and bends at right angles to form arms of U 42 which are in sliding relation with the arms of U 33 and which have at the ends opposed or diverging flanges 43. It will be seen that the base of the U 32 is parallel and spaced from the base of the U 41 and that the flanges 34 and 43 are in the relation of underlying and overlying members opposite one another. Along each housing section there are several points at which screws are attached to position the telescoping parts apart, several places at which the same or different screws are adapted to operate to pull the telescoping parts together, and several places at which springs push the telescoping parts together. The frequency at which these points of screw or spring location are placed is not critical, but in a 10 foot length the screws may be located at three distributed points on each side and the springs located at five equally distributed points on each side in a typical embodiment.

Figure 4:
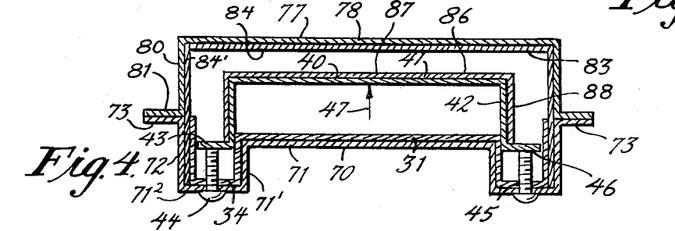
FIG. 4 on the line 4—4 of FIG. 3, is a section through a coupling with the telescoping U-shaped members of the housing in expanded position prior to insertion of the conductors.
Figure 5:
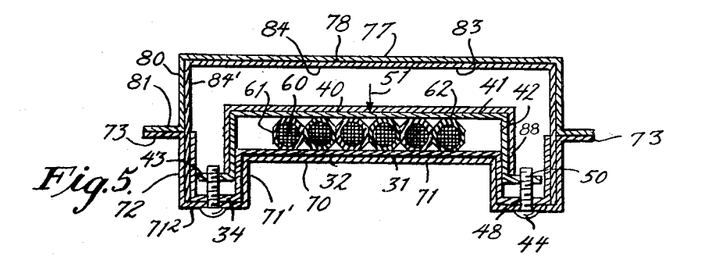
FIG. 5 is a view corresponding to FIG. 4 showing insulated conductors in place and the telescoping U-shaped members contracted.
Figures 6, 7:
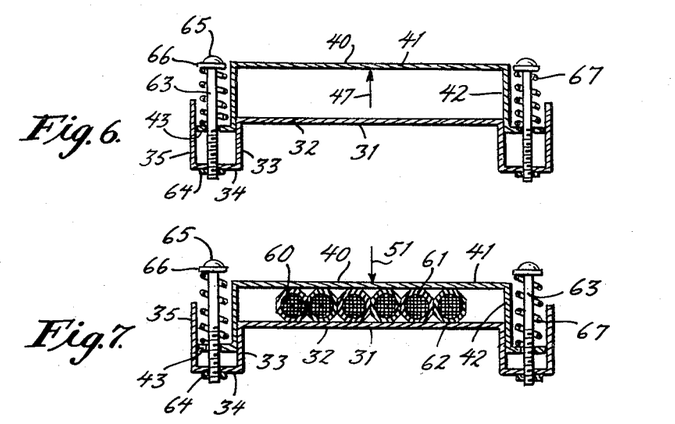
FIG. 6 is a section of the cablebus of the invention on the line 6—6 of FIG. 3 through a location at which springs are present, showing the U-shaped members of the cablebus housing expanded.
FIG. 7 is a view corresponding to FIG. 6 in which the telescoping U-shaped members are contracted and insulated conductors are in place.

By reference to FIG. 4 it is seen that screws 44 pass through and are threaded in the oppositely diverging flanges of the lower U 31 at 45 and press against the diverging flanges 43 of the upper U 40 at 46, moving the telescoping parts into their position of maximum separation as shown by arrow 47 in FIGS. 4 and 6 at which insulated wires can be threaded through the cablebus. In FIG. 5 the screws 44 have been moved and passed through clear openings 48 in opposed diverging flanges 34 and through threaded openings 50 in opposed diverging flanges 43 of the upper inverted U-shaped portion 40, thus pulling the telescoping parts into their contracted position as indicated by arrow 51 in FIGS. 5 and 7.

Conductors 60 have insulation 61 of preferably octagonal shape and having opposed faces 62 are engaged on the opposed faces by U bases 31 and 41, providing excellent heat dissipation from the conductors to the cablebus, and also holding the conductors firmly mechanically against mechanical and electromagnetic forces. The conductors are of multiple strand type, suitably of copper or aluminum alloys.

At intervals along the conductors as shown in FIGS. 6 and 7 spring plungers 63 extend through cooperating openings in diverging flanges 34 and 43 and are retained by nuts 64 on the bottom and by heads 65 and washers 66 on the top. Between the diverging flanges 43 and the washers 66 are compressed helical compression springs 67 which tend to push the telescoping parts into telescoping position and thus relieve somewhat the load on the screws 44 in the position of FIG. 5. It will be evident that the springs are optional.

Figure 1:
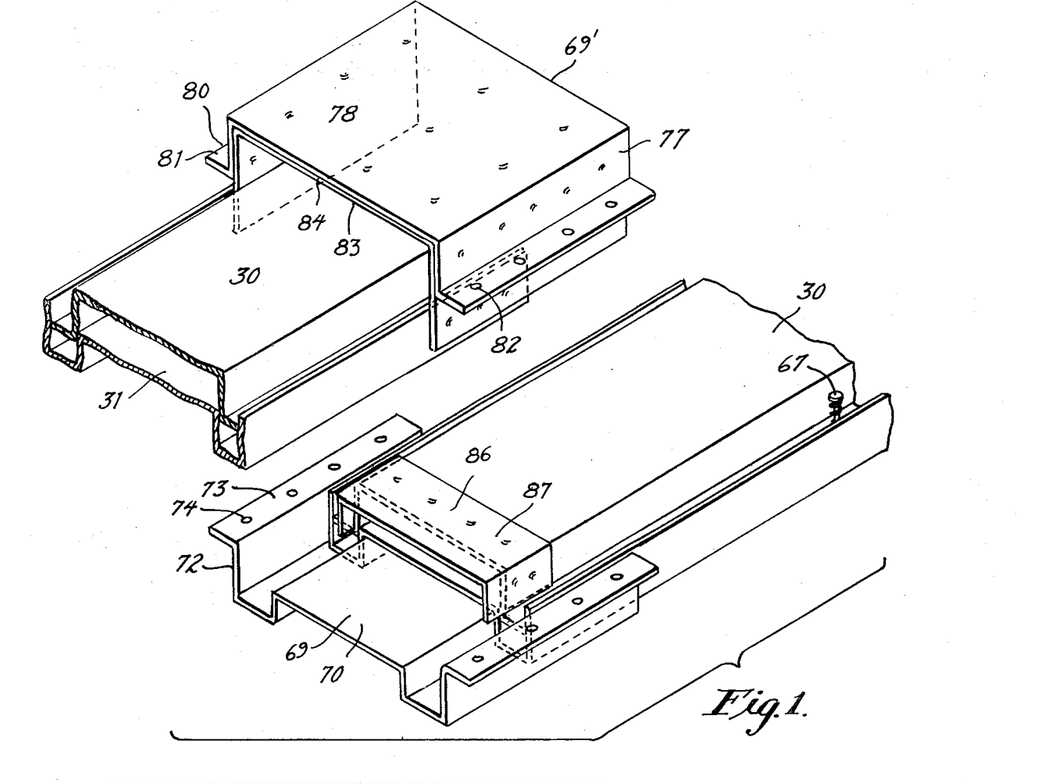
FIG. 1 is an exploded perspective showing both ends of a cablebus housing of the invention.

Each housing section has a source end 69 and a load end 69'. At the source end, in position to join with some other fitting which may be a source flange coupling to begin a run or load transition coupling for attachment to access fittings, is a generally U-shaped member 70 which is adapted to generally conform to and generally lie outside of or below the bottom U-shaped member 31 of the envelope section previously described. This has a base of the U 71, arms of the U 71', diverging outwardly bent flanges 71² and then parallel upwardly extending flanges 72 and diverging outwardly extending flange 73 about the middle of the height of the coupling. The U-shaped member 70 is suitably spot welded to the bottom envelope member 31 to permanently join the two together. The flanges 73 have bolt holes 74 to join to the opposite coupling member. There is clearance between the upstanding parallel flanges 35 of the bottom channel member 31 and the upstanding parallel flanges 72 as later discussed. The lower coupling member 70 extends for about one-half its length beyond the cablebus housing at the source end. There are holes placed for the screws 44.

At the load end 69' of each envelope section there is an inverted U-shaped coupling member 77 which extends for one-half of its length beyond the load end of the cooperating envelope section and which is fastened to the lower half 31 of its envelope. This has a base of the U 78, arms of the U 80 and opposed diverging flanges 81 adapted to cooperate with the flanges 73 and having bolt holes 82 which cooperate with the bolt holes 74 and receive bolts 85 to joint them together. The coupling member 77 matches in length the coupling member 70.

The coupling member 77 at the load end is held in place on the bottom of its cablebus envelope by a bridge member 83 of inverted U-shape having a base of the U 84 and arms of the U 84' which fit inside the flanges 72 of the lower coupling member and outside the flanges 35 of the envelope when the couplings are placed together. This bridge member is united as by spot welds to the flanges 35 of its cooperating envelope.

At each joint on the cover 40 at the source end, there is a U-shaped rabbet 86 extending beyond the envelope, and having a base of the U 87 conforming to the top U portion 41 and arms of the U 88 conforming to the arms of the U 42 of the cover and united thereto as by spot welds. The rabbet 86 provides a dust seal with the cover of the adjoining envelope and a bearing surface for raising or securely closing the cover of the adjoining envelope when the control screws move the cover having the rabbet open or closed.

Figure 2:
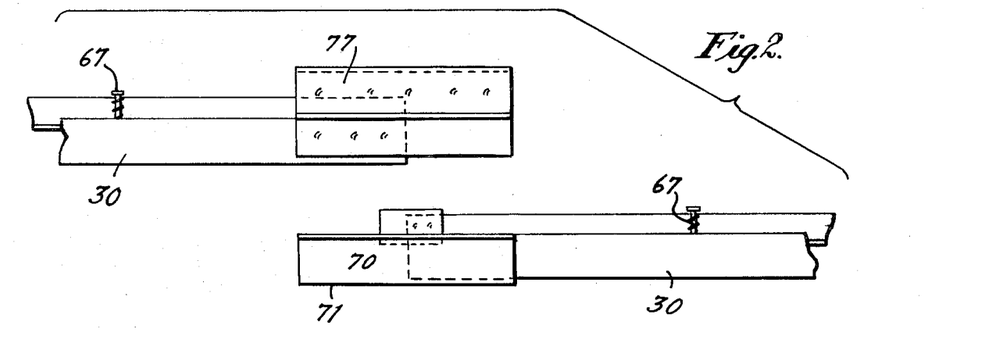
FIG. 2 is a fragmentary side elevation of two cablebus housing sections about to form a coupling.
Figure 3:
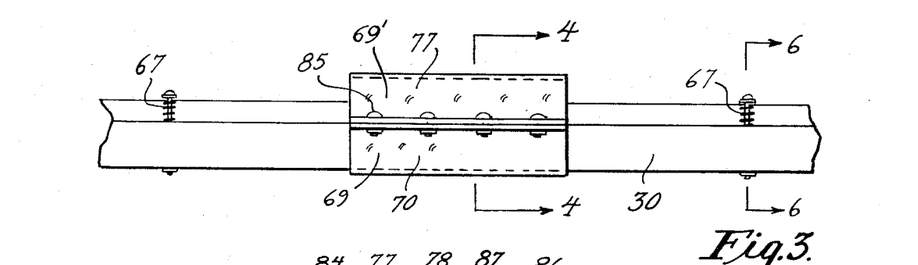
FIG. 3 is a fragmentary side elevation of two cablebus housing sections forming a coupling.

Thus when the two cablebus sections are joined, they are surrounded completely at the ends by the U-shaped coupling members 70 and 77, reinforced by the bridge members 84, which permit the total enclosure of the cablebus housing whether expanded or contracted, by members in each case anchored to the lower channel member of each section.

Figure 13:
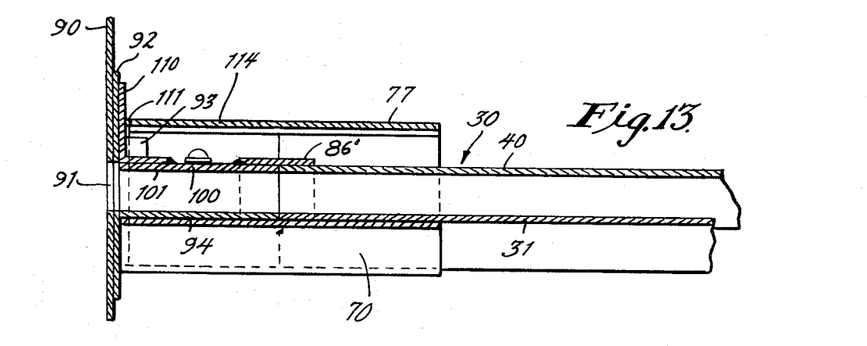
FIG. 13 is a fragmentary section on the line 13—13 of FIG. 12 showing the telescoping U-shaped members expanded.
Figure 14:
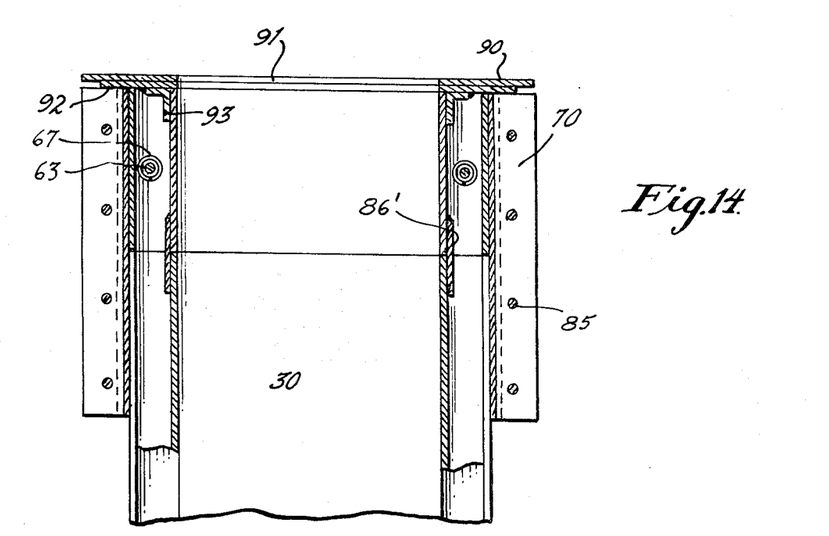
FIG. 14 is a fragmentary section on the line 14—14 of FIG. 12.
Figures 15, 16, 17, 18, 19, 20, 21, 22, 23, 24, 25:
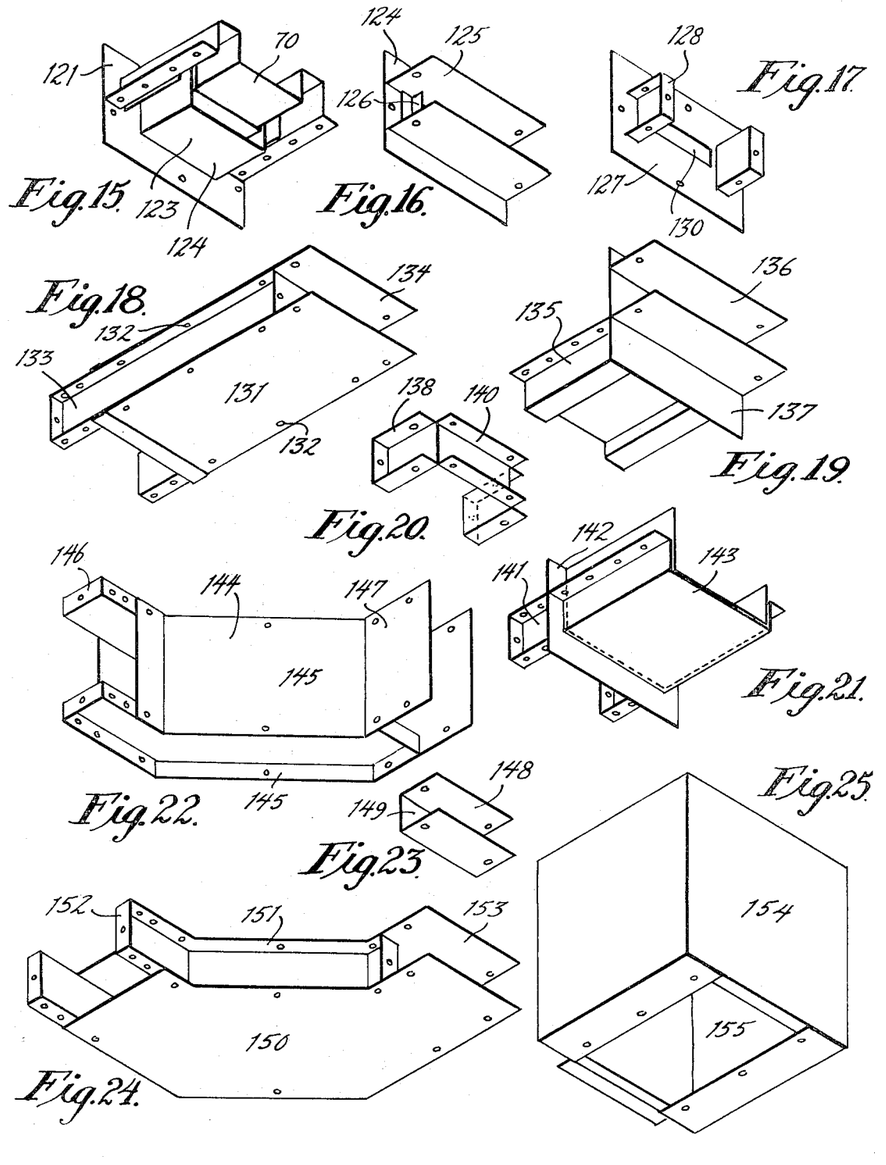
FIG. 15 is a perspective of a flange coupling. This figure is upside down with respect to its normal position in use, for the purpose of clear illustration.
FIG. 16 is a perspective of a source equipment coupling.
FIG. 17 is a perspective of a load equipment coupling.
FIG. 18 is a perspective of a straight access connector.
FIG. 19 is a perspective of a source transition coupling.
FIG. 20 is a perspective of a load access plate.
FIG. 21 is a perspective of a load transition coupling.
FIG. 22 is a perspective of an edgewise access elbow.
FIG. 23 is a perspective of a source access plate.
FIG. 24 is a perspective of a flatwise access elbow.
FIG. 25 is a perspective of the junction box.

In the invention there are the following primary types of fittings which are used and may be classified as follows:

1. There are fittings which have a flange at one end and a U-shape or channel member at the other end and which are adapted to make the transition from a source piece of equipment adapted to fit a source flange coupling such as a transformer housing, a circuit breaker housing, a distribution housing or the like, as shown in FIGS. 8 to 14, to a cablebus source end coupling or a similar piece of equipment, in which case the U-shape or channel member source flange coupling must be in the upper part, or it may be a load flange coupling adapted to make the cablebus connection to a junction box, distribution box, switch housing or other piece of equiipment at the terminating load end, in which case a cablebus load flange coupling connects to the U-shape or channel member of a load flange coupling as depicted in FIG. 15.

2. The fitting may make the transition from a flange connector at one end to a plug or socket connector at the other end in which case it may connect to a transformer housing, circuit breaker housing or distribution housing at the source end, then through an access coupling which has a plug or a socket connector and permits making a tap, a junction or the like. At the other end it may connect through a plug or socket connector to another flange connection connecting to a junction box. Likewise at the load end it may have a junction box or the like which leads through a flange connector and a plug or socket connector to an access coupling for making electrical connections or otherwise.

Types of plug or socket connectors having flanges on the other end are as follows:
Source equipment coupling — FIG. 16
Load equipment coupling — FIG. 17

Types of access connectors or elbows are the following:
Straight access connector — FIG. 18
Edgewise access elbow — FIG. 22
Flatwise access elbow — FIG. 24

For closing the ends of the plug or socket the following are provided:
Source access plate — FIG. 23, which closes the end of a plug.
Load access plate — FIG. 20, which closes the end of a socket.

It will be evident that the plug and socket connectors are unusual in that they are held together by screws transverse to the axis.

3. In this sequence one needs to convert from a straight section of cablebus to a plug or socket connector and for this purpose the following are provided:
A source transition coupling — FIG. 19
A load transition coupling — FIG. 21

4. In addition a junction box of FIG. 25 is provided if extensive tapping is required.

Considering the source access coupling which begins a run as shown in FIGS. 8 to 15, it has a flange 90 at right angles to the axis of the cablebus which has a clear hole through it at 91 to permit the conductors to extend through either in expanded or contracted position. The flange 90 is adapted through suitable bolt holes to be connected to a piece of equipment at the source. The flange is reinforced by a reinforcement 92 which has a similar opening through it in line with the opening 91. The reinforcing flange 92 has angles 93 welded to it at the sides which make welds with an inverted U-shaped bottom element 94, which is the prolongation of the envelope element 31 and has a base of the U 95, arms of the U 96, diverging end flanees 97, and reverse bend flanges 98 symmetrical with respect to the U-shaped portion of the bottom of the housing.

Figures 8, 10:
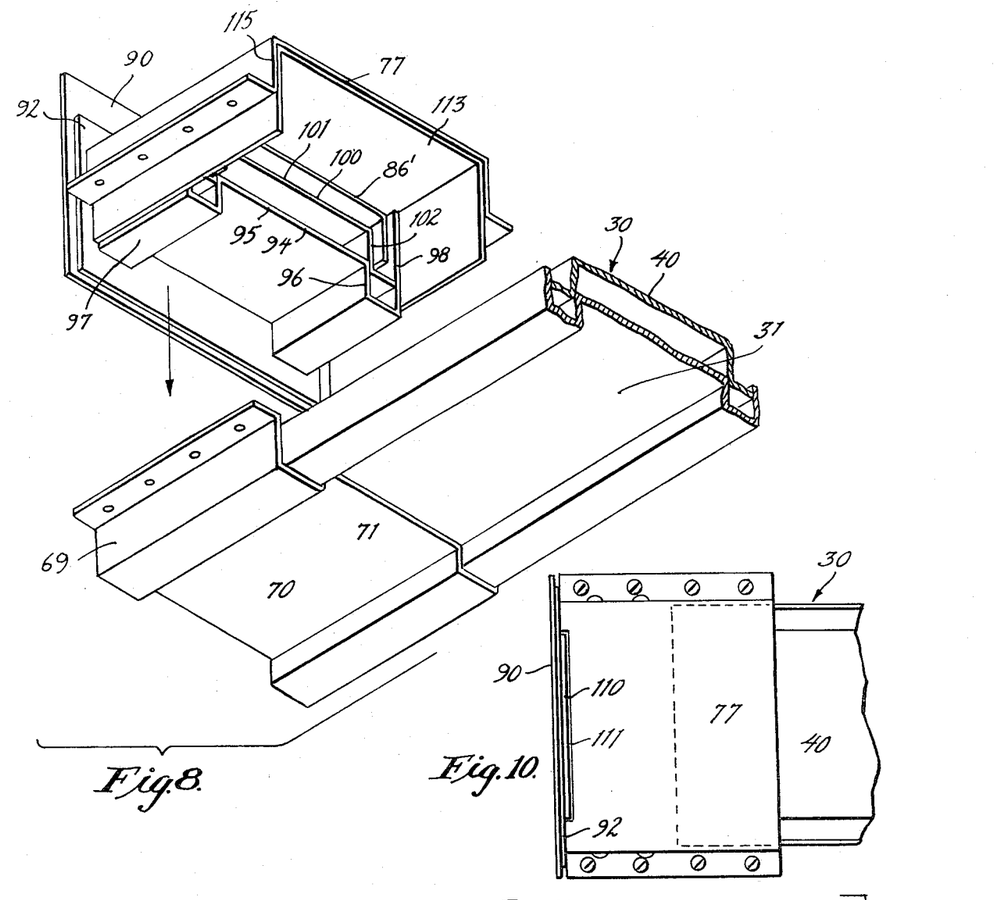
FIG. 8 is an exploded fragmentary perspective showing a flange coupling and a cablebus end having a coupling which are to be joined.
FIG. 10 is a fragmentary top plan view of FIG. 9 along the line 10—10 of FIG. 9.
Figure 9:
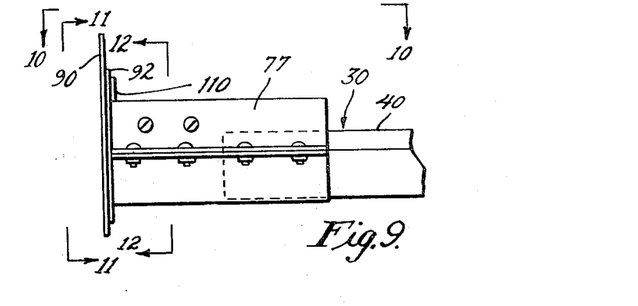
FIG. 9 is a fragmentary side elevation showing the completed junction of FIG. 8.
Figure 11:
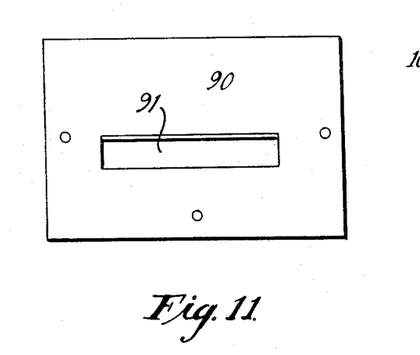
FIG. 11 is an elevation looking toward the end flange of FIGS. 8 to 10.
Figure 12:
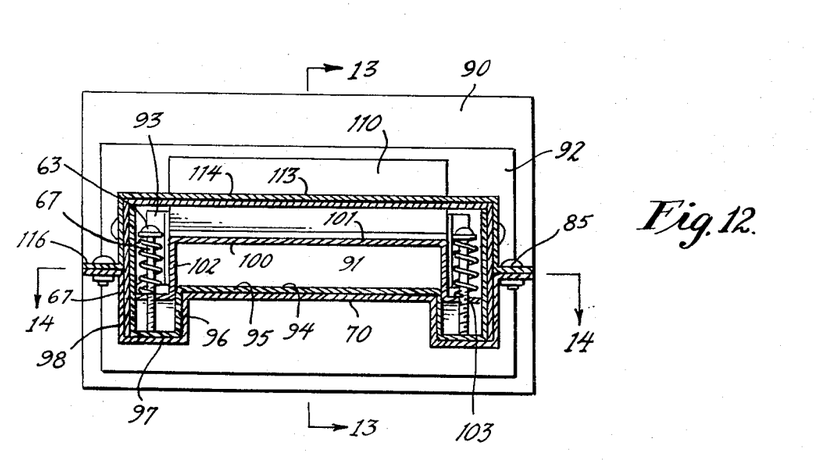
FIG. 12 is a section on the line 12—12 of FIG. 9, showing the telescoping U-shaped members expanded.

The telescoping U-shaped member 94 cooperates with an inverted telescoping member 100 symmetrical with the member 40 which has a base of a U 101, arms of the U 102 and diverging flanges 103 opposite to the diverging flanges 97. The U-shaped member acts like the cablebus cover previously described. On top of the base of the U 101 there is a rabbet 86' secured thereto which makes an interlock with the adjoining cablebus cover 40.

Between flanges 97 and 103 there are spring plungers 63 which are secured to the flanges 97 and pass through openings in the flanges 103, and spiral compression springs 67 retained by plunger heads and washers as previously described so as to urge the telescoping members 94 and 100 into collapsed position. The base 101 of the U-shaped member 100 has secured to it by welding a curtain flange 110 parallel to the flange 90 and to the reinforcing 92 which moves up and down and serves to avoid dust.

Above the telescoping members 94 and 100 and straddling the reverse bend flanges 98 there is on top a coupling member 77 like the coupling member previously described in connection with FIGS. 1 to 7 which lies outside of and straddles a bridge member 83 as previously described. The coupling member and the bridge member extend longitudinally beyond the members 94 and 100 as shown in FIG. 8 so that the coupling member can cooperate with a source end coupling as shown, for example, in FIG. 1. The coupling member 77 and the bridge member 83 are united as by welding to the flange 90 and the reinforcing 92. In the top of the coupling member 77 there is a slot 111 through which the curtain element can move up and down.

In FIG. 15 a load flange coupling is shown which is the opposite counterpart of the source flange coupling described in FIGS. 8 to 14, having an end flange 121, cooperating telescoping members 122 and 123 which are symmetrical with the members 31 and 40, and extending longitudinally beyond half coupling member 70 as shown in FIGS. 1 to 7. It will be remembered that FIG. 15 is inverted for illustration purposes with respect to its normal position.

In FIG. 16 is shown a source equipment coupling having a flange 124 transverse to the axis, a conductor opening and a socket 125 defined by projections which are parallel to the bases of the U's of the telescoping members, the end being closed by a dust protector 126. This is attached to make connection to one end of the fittings shown in FIGS. 18, 20, 21, 22 or 24 by screws through the projections.

In FIG. 17 I show a load equipment coupling having a flange 127 transverse to the axis at one end, plug connectors 128 parallel to the telescoping sides of the U's of the housing and an axial opening 130. The plug connectors have screw holes at which they are to be made fast to the sockets in FIGS. 18, 19, 22, 23 or 24.

In FIG. 18 a straight access connector 131 is shown having closed sides with removal plates by detachment of screws 132. At one end they have plug connectors 133 adapted to make connection to the sockets of FIGS. 16, 19, 22, 23 and 24 by screws and at the other end it has a socket 134 adapted to make connection to the plug connectors of FIGS. 17, 20, 21, 22 or 24 by screws.

In FIG. 19 a source transition coupling is shown having a U-shaped or channel shaped source coupling 135 which is adapted to make connection with load couplings on cablebus sections or to a source flange coupling and at the other end this has a scket connector 136 which is adapted to make connection by screws to any of the plug connectors of FIGS. 17, 18, 20, 21, 22 or 24. There is an axial opening in the flange 137' as previously disclosed.

In FIG. 20 a load access plate is shown which has plug connectors 138 at one end adapted to make connection by screws with any of the socket connectors of FIGS. 16, 18, 19, 22 or 24.

In FIG. 21 there is a load transition coupling which has plug connectors 141 at one end which are adapted to connect by screws with socket connectors in any of FIGS. 16, 18, 19, 22, 23 or 24, which has a flange 142 which has an axial opening for the conductors, and which has at the other end a U-shaped or channel shaped coupling 143 which is coupled with a straight section of cablebus housing with a fitting as shown in FIG. 15.

Edgewise access elbow 144 of FIG. 22 has removal plates 145 to permit access to and splicing conductors or for leading them around the bend, and plug and socket connectors 146 and 147 at ends which are adapted to connect by screws with any of the fittings of FIGS. 16, 17, 18, 19, 20, 21, 23 or 24.

The source access plate of FIG. 23 shows a socket connector 148 and an end plate 149 which is adpated to close any of the plug connector ends of FIGS. 17, 18, 21, 22 or 24.

In FIG. 24 a flatwise access elbow 150 has screw removable plates 151 to permit access to splice or thread conductors around the elbow, plug connector 152 at one end and socket connector 153 at the other end. In common with all of these other fittings it has a hollow interior and shape so that conductors can be contained within it and are biased to engagement with the enclosure for heat transfer in passing through.

FIG. 25 shows a junction box 154 which has openings at opposite ends 155 which are adapted to attach to the flanges of FIG. 18 having side plate removable with suitable bolting of the flanges around the openings 155. The sides of the junction box are removable by detaching suitable bolts.

It will be evident that the cablebus is assembled by joining its sections with suitable fittings, using hangers which preferably surround the cablebus housing, and permitting the cablebus to lie cover side up, on either side horizontally, vertically or otherwise as desired by the installer. When the cablebus is installed, it is placed in an expanded position and after the conductors are threded through and correctly connected, the cablebus houing is moved to a contracted position at which it will have the most effect in heat dissipating and in restraining the conductors Source flange or source equipment couplings will be used to begin a run of preferred sequence of enclosed cablebus, with straight and turn access fittings and straight sections to meet installation and load requirements terminating with load flange, equipment flange and end closures.

Where it is desired to put in equipment, source and load transition couplings are used with access fittings as desired.

The invention has the advantage of requiring no pulling of conductors around elbows since the access plates when removed permit straight easy insertion or splicing of conductors through straight legs of run.

While the continuous extruded insulation may be, in cross section, rectangular, square or circular, I prefer to use octagonal insulation. The conductor is a bundle of wires arranged in the contour of a circle and preferably comprises concentric lay multiple conductors. The layer of insulation is preferably at least 0.050 inches thick.

The insulation may be of rubber, synthetic rubber such as neoprene, Teflon TFE (polytetrafluoroethylene) or National Electric Code Standard insulation TWHN. The preferred insulation used is a moisture and heat resistant thermoplastic of approved types described in National Electrical Code, Article 310, about 50 mils thick permitting a temperature rise of 90°; tested and approved by Underwriters Laboratories for use in this totally enclosed cablebus.

The metallic parts of the cablebus are preferably made of steel, aluminum, stainless steel or any other structural material with suitable corrosion protection as desired.

Figure 26:
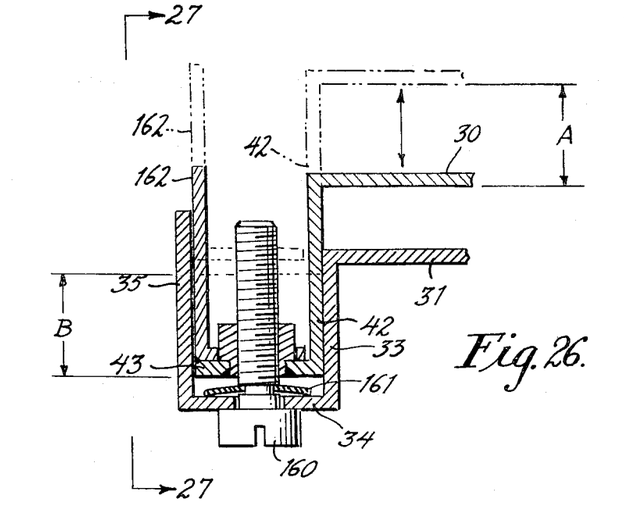
FIG. 26 is a fragmentary transverse section of a modified form of clamp for the telescoping members.
Figure 27:
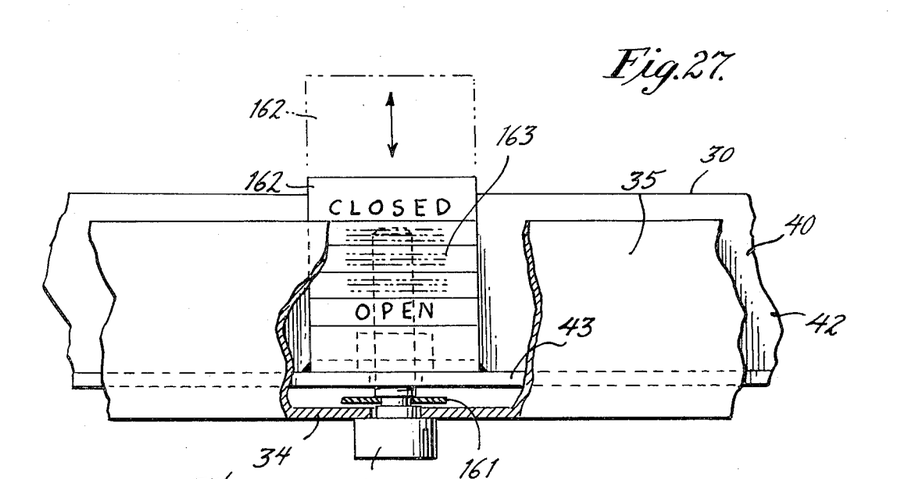
FIG. 27 is a fragmentary side elevation of an index for the modified clamp of FIG. 26, partially broken away.

In FIGS. 26 and 27 I show a modification of the screw means to hold the telescoping elements of the cablebus housing apart or to move them together. In these figures a screw 160 passes through a clear hole in the diverging flange 34 and is retained against longitudinal motion on the other side by a snap washer 161. The screw 160 is then threaded through a welded nut in the diverging flange 43 to move the telescoping member 40 up or down. Anchored to the diverging flange 43 is a L-shaped index 162 which has on its outer surface parallel to the arms 42 of the U a scale 163 and which registers with the ends of the reverse bend flanges 35 to indicate at a glance whether the cablebus housing is expanded or contracted and which of various sizes of insulated conductors are in the housing.

The heat conductivity of the cablebus of the invention is so good that in some cases it is possible to simplify the fittings by omitting the heat sink function in the fittings. This produces a great simplification in the method of making the joints.

Figure 28:
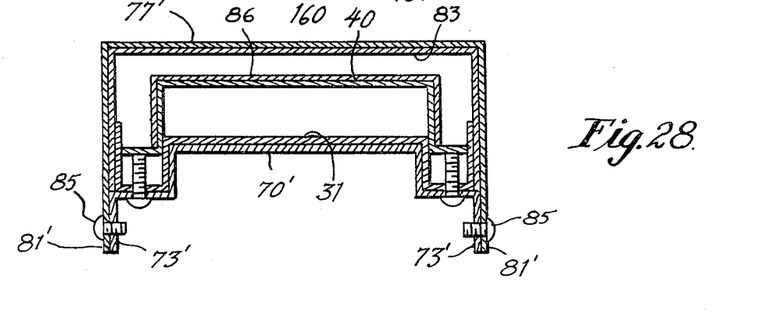
FIG. 28 is a diagrammatic section of a modification in coupling, the section being generally similar to FIG. 4.

In FIG. 28 a cross section of a coupling joint according to the invention is shown in which the flanges from the two coupling halves instead of being oppositely diverging and meeting in the middle extend down in parallel relation in prolongation of the sides and meet below the cablebus in normal position. Thus as shown in FIG. 28, which resembles FIG. 4, the lower coupling member 70' has parallel downwardly extending coupling flanges 73' which are joined to an upper coupling member 77' which has downwardly parallel coupling flanges 81'. The two coupling flanges 73' and 81' are joined by bolts 85.

An advantage of this form of FIG. 28 is that since there is no heat sink feature in the access fittings, the depth can be increased to permit the ends to be interegated into the access fittings and employ a source and load flange coupling for connecting to straight cablebus lengths. This depth also permits 180° reversal of the relative position of the flange couplings as a transition of the surface of entering sections.

With the ends integrated to the access fittings, direct attachment can be made to equipment to eliminate the need of equipment couplings.

In summary therefore the form of FIG. 28 having an edge bolting to the bottom would eliminate the need for the following components:

The transition couplings of FIGS. 19 and 21
The equipment couplings of FIGS. 16 and 17
The access plates of FIGS. 20 and 23

In the best form of the invention I contemplate blackening the parts of the housing and fittings on the inside to improve heat transfer from the conductors.

This blackening is preferably non-glossy or dull. Any darkening finish on the inside is helpful.

In view of my invention and disclosure, variations and modifications to meet individual whim or particular need will doubtless become evident to others skilled in the art, to obtain all or part of the benefits of my invention without copying the apparatus shown, and I therefore claim all such insofar as they fall within the resonable spirit and scope of my claims.

Having thus described my invention, what I claim as new and desire to secure by Letters Paeent is:

1. A totally enclosed cablebus housing comprising a first member of U-shape having a base of the U and arms of the U, a second member of U-shape telescoping the first member and having a base of the U parallel to the base of the U of the first member and arms of the U slidable with respect to the arms of the U of the first member, the bases of the U's in one position being adapted to contact opposed parallel sides of conductor insulation, and the bases of the U's in another position being expanded so that they present an enlarged passageway to thread the conductors through the passageway, a first coupling half of channel shape extending around the U of the first member, secured to the first member, open toward the second member, extending beyond the first and the second member at one end and having coupling flanges, and a second coupling half adapted to cooperate with the first coupling half on another housing component of channel shape extending around the U of the second member, secured to the first member, open toward the first member, extending beyond the first and second members at the other end, and having coupling flanges adapted to mate with those of another housing component and form a coupling enclosure.

2. A totally enclosed cablebus housing comprising a first member of U-shape having a base of the U and arms of the U, a second member of U-shape telescoping with respect to the first mumber and having a base of the U parallel to the base of the U of the first member and arms of the U slidable with respect to the arms of the U of the first member, the bases of the U's in one position being adapted to contact opposed parallel sides of conductor insulation, and the bases of the U's in another position being expanded so that they present an enlarged passageway to thread through the conductors, a first coupling half of channel shape extending around the U of the first member, secured to the first member, open toward the second member, extending beyond the first and the second member at one end and having coupling flanges, a second coupling half adapted to cooperate with the first coupling half on another housing component of channel shape extending around the U of the second member, secured to the first member, open toward the first member, extending beyond the first and second members at the other end, and having coupling flanges adapted to mate with those of another housing component to form a coupling enclosure, a first additional fitting having an additional coupling half of channel shape extending around one of the U's of the housing in cooperation with one of the members of the housing, an end flange having an opening through which conductors may pass, secured to the additional coupling half, extending at right angles to the length of the housing, a first additional U-shaped coupling member extending in length less than the coupling half of the fitting, having a base of the U and arms of the U and extending to the end of the flange, a second additional U-shaped coupling member telescoping with respect to the first additional U-shaped coupling member extending to the end of the flange and less than the length of the coupling half of the fitting, and having a base of the U parallel with the base of the U of the first U-shaped member and arms of the U slidable with respect to the arms of the first U-shaped coupling member, the bases of the U in one position being adapted to contact opposed faces of conductor insulation, the housing half of the additional fitting cooperating with one of the housing halves of the housing to complete the cablebus to the additional coupling and flange.

3. A cablebus of claim 2, having a bridge member inside the additional coupling half which is secured to the end flange and extending longitudinally the full length of said additional coupling half, said bridge member being united to said first U-shaped member which is within said additional coupling half.

4. A cablebus of claim 2, in combination with a curtain flange at right angles to the base of the U of the second member of bhe additional fitting and adjoin the end flange on the additional fitting to seal the space within the second member on the additional fitting when it is in contracted position.

5. A totally enclosed cablebus housing comprising a first member of U-shape having a base of the U and arms of the U, a second member of U-shape telescoping with respect to the first member and having a base of the U parallel to the base of the U of the first member and arms of the U slidable with respect to the arms of the U of the first member, the bases of the U's in on position being adapted to contact opposed parallel sides of conductor insulation, and the bases of the U's in another position being expanded so as to present an enlarged passageway through which the conductors may be threaded, a first coupling half of channel shape extending around the U of the first member, secured to the first member, open toward the second member, extending beyond the first and second member at one end and having coupling flanges, a second coupling half adapted to cooperate with the first coupling half on another housing component of channel shape extending around the U of the second member, secured to the first member, open toward the first member, extending beyond the first and second members at the other end, and having coupling flanges adapted to mate with those on another housing component and form a coupling enclosure, a first supplemental coupling having a coupling half of channel shape extending around the U of one of the members of the housing, open toward the other member of the housing and extending beyond the first and second members of the housing at one end to complete a closure, opposed parallel longitudinally extending prongs from the first supplemental coupling away from the housing on the sides in which the first and second members of the housing have their arms of the U in slidable engagement, there being a clear opening for carrying insulated conductors into the space, between the prongs, and a second supplemental coupling connected to the first supplemental coupling at the prongs and having a socket engaging the first supplemental coupling on the sides of the bases of the U of the housing, surrounding the space for the conductors, and adapted to permit access to conductors within the second supplemental coupling, the second supplemental coupling at the opposite end having prongs on the side adjoining the sliding side walls of the housing for engaging with a further fitting.

6. A totally enclosed cablebus fitting having a coupling half of channel shape which has a base of the U, two arms of the U and outwardly diverging flanges, an end fla4ge on the fitting at right angles to the base of the U having an oepning through which conductors may pass, which end flange is secured to the coupling half, a first U-shaped coupling member of less length than the coupling half extending within the coupling half to an end flange and having a base of the U and arms of the U, a second U-shaped coupling member telescoping with respect to the first U-shaped coupling member extending to the end flange and of less length than the coupling half of the fitting and having the base of the U parallel to the base of the U of the first U-shaped coupling member and arms of the U slidable with respect to the arms of the first U-shaped member, and a curtain flange at right angles to the base of the U of the second U-shaped member of the fitting and adjoining the end flange of the fitting to seal the space when the second member of the fitting is contracted.

7. A totally enclosed cablebus fitting combination having a first supplemental coupling having a coupling half of channel shape provided with a base of the U, two arms of the U and coupling flanges from opposite ends of the arms of the U and adapted to cooperate with a similar coupling half to complete a closure, exposed parallel longitudinally extending prongs from the first supplemental coupling away from the coupling half, there being a clear opening for carrying insulated conductors in the space between the prongs and a second supplemental coupling connected to the first supplemental coupling at its prongs and itself having a socket engaging the first supplemental coupling at right angles with the prongs of the first supplemental coupling, adapted to surround the conductors and adapted to permit access to the conductors within the second supplemental coupling, the second supplemental coupling at the opposite end having prongs symmetrical and parallel with the prongs of the first supplemental coupling.

8. A totally enclosed cablebus fitting combination having a first supplemental coupling having a coupling half of channel shape provided with a base of the U, two arms of the U and coupling flanges from opposite ends of the arms of the U and adapted to cooperate with a similar coupling half to complete a closure, exposed parallel longitudinally extending sockets from the first supplemental coupling away from the coupling half, there being a clear opening for carrying insulated conductors in the space between the sockets, and a second supplemental coupling connected to the first supplemental coupling at the sockets and itself having prongs engaging the first supplemental coupling at right angles with the sockets of the first supplemental coupling, adapted to surround the conductors and adapted to permit access to the conductors within the second supplemental coupling, the second supplemental coupling at the opposite end having prongs symmetrical and parallel with the sockets of the first supplemental coupling.

* * * * *